United States Patent
Murota

[19]

[11] Patent Number: 5,960,675

[45] Date of Patent: Oct. 5, 1999

[54] TRANSMISSION

[75] Inventor: Kazuya Murota, Ebina, Japan

[73] Assignee: Nissan Motor Co., Ltd., Yokohama, Japan

[21] Appl. No.: 08/330,136

[22] Filed: Oct. 25, 1994

Related U.S. Application Data

[63] Continuation-in-part of application No. 08/074,746, Jun. 10, 1993, abandoned.

[30]  Foreign Application Priority Data

Jun. 25, 1992 [JP] Japan .................................. 4-167816

[51] Int. Cl.⁶ .................................................. F16H 57/02
[52] U.S. Cl. ......................................... 74/606 R; 475/284
[58] Field of Search .......................... 74/606 R; 475/284, 475/285, 313, 225, 339, 340, 200, 206, 210

[56]  References Cited

U.S. PATENT DOCUMENTS

| | | | |
|---|---|---|---|
| 4,736,653 | 4/1988 | Hayakawa et al. | 74/606 R X |
| 5,152,190 | 10/1992 | Jurgens et al. | 74/606 R |
| 5,188,575 | 2/1993 | Leising et al. | 475/284 X |
| 5,235,320 | 8/1993 | Sawasaki | 74/606 R |
| 5,235,413 | 8/1993 | Sherman | 74/606 R |

FOREIGN PATENT DOCUMENTS

| | | | |
|---|---|---|---|
| 0045169 | 3/1986 | Japan | 74/606 R |
| 0157873 | 7/1986 | Japan | 74/606 R |

OTHER PUBLICATIONS

"Toyota Automatic Transmission Repair Instruction A341E", vol. 63231 (Nov. 1981).
"Nissan Automatic Transaxle RL4F03A—Maintenance Procedure Manual", (May 1989).

*Primary Examiner*—Vinh T. Luong
*Attorney, Agent, or Firm*—Foley & Lardner

[57]  ABSTRACT

A transmission includes a shaft, a sleeve receiving the shaft and including a first sleeve portion and a second sleeve portion. A drum is rotatably supported on a bearing by a bearing support which is formed on the first sleeve portion. Seal ring grooves are formed on the second sleeve portion. The first and second sleeve portions have walls which define first and second bore sections, respectively. The inner diameter of the second bore section is larger than the inner diameter of the first bore section. The first sleeve portion is firmly engaged with the shaft while the second sleeve portion is in spaced relationship with the shaft with clearance fit.

4 Claims, 3 Drawing Sheets

TRANSMISSION

This application is a continuation-in-part of application Ser. No. 08/074,746 filed on Jun. 10, 1993 now abandoned.

BACKGROUND OF THE INVENTION

The present invention relates to a transmission for vehicles, and more particularly to a drum supporting structure in which a drum is rotatably supported on a sleeve a portion of which is loosely engaged with a shaft with clearance fit.

A conventional transmission includes a drum rotatably supported on a stationary shaft. A relatively large frictional stress is exerted on the shaft during rotation of the drum. In order to reduce the frictional stress on the shaft, there has been proposed a transmission in which the drum is supported on the shaft through a sleeve which is interposed therebetween.

Such a transmission is disclosed in a publication entitled "TOYOTA AUTOMATIC TRANSMISSION REPAIR INSTRUCTION A341E, November, 1989 (Vol. 63231)". The transmission includes a sleeve made of a wear resisting material and press-fitted onto a stationary shaft. A drum is rotatably supported on the shaft through the sleeve. Seal ring grooves are formed on a circumferential face of the sleeve in an axially spaced relation. The seal ring grooves receive seal rings therein.

However, upon press-fitting, the sleeve is radially expanded due to a tensile stress exerted thereon. Then, the seal ring grooves must be subject to a hoop tension which causes reduction in durability of the seal rings. If using the sleeve having an increased thickness or an increased length in order to enhance strength of the sleeve against the hoop tension, the transmission should be increased in weight or size. Alternatively, if the sleeve is subject to heat treatment for enhancement of the strength, a subsequent cutting for forming the seal ring grooves on the treated sleeve is not readily performed.

SUMMARY OF THE INVENTION

An object of the present invention is to provide a transmission including a sleeve capable of preventing a stress from being exerted thereon upon press-fitting, and therefore eliminating a hoop tension exerted on seal ring grooves formed on the sleeve.

According to one aspect of the present invention, there is provided in a transmission:

a shaft having an axis;

sleeve receiving the shaft, the sleeve being axially, with respect to the axis, divided into and including a first sleeve portion and a second sleeve portion, the first sleeve portion being formed with a bearing support, the second sleeve portion being formed with seal ring grooves; and a drum rotatably supported by the bearing support of the first sleeve portion, the first sleeve portion being formed with a first bore section and wall means for defining the first bore section, the second sleeve portion being formed with a second bore section and wall means for defining the second bore section, the first bore section defining wall means being firmly engaged with the shaft, the second bore section defining wall means being in spaced relationship with the shaft with clearance fit. According to a further aspect of the present invention, there is provided a transmission comprising:

a shaft having an axis;

a sleeve receiving the shaft, the sleeve being axially, with respect to the axis, divided into and including a first sleeve portion and a second sleeve portion, the first sleeve portion being formed with a bearing support; and a drum rotatably supported by the bearing support of the first sleeve portion;

the first sleeve portion being formed with a first bore section and first wall means for defining the first bore section;

the second sleeve portion being formed with a second bore section and second wall means for defining the second bore section;

the second wall means carrying seal rings and providing a cylindrical clearance between the second wall means and the shaft for preventing a stress from being exerted on the seal rings via the second wall means.

DETAILED DESCRIPTION OF THE PREFERRED EMBODIMENTS

Figure 1:
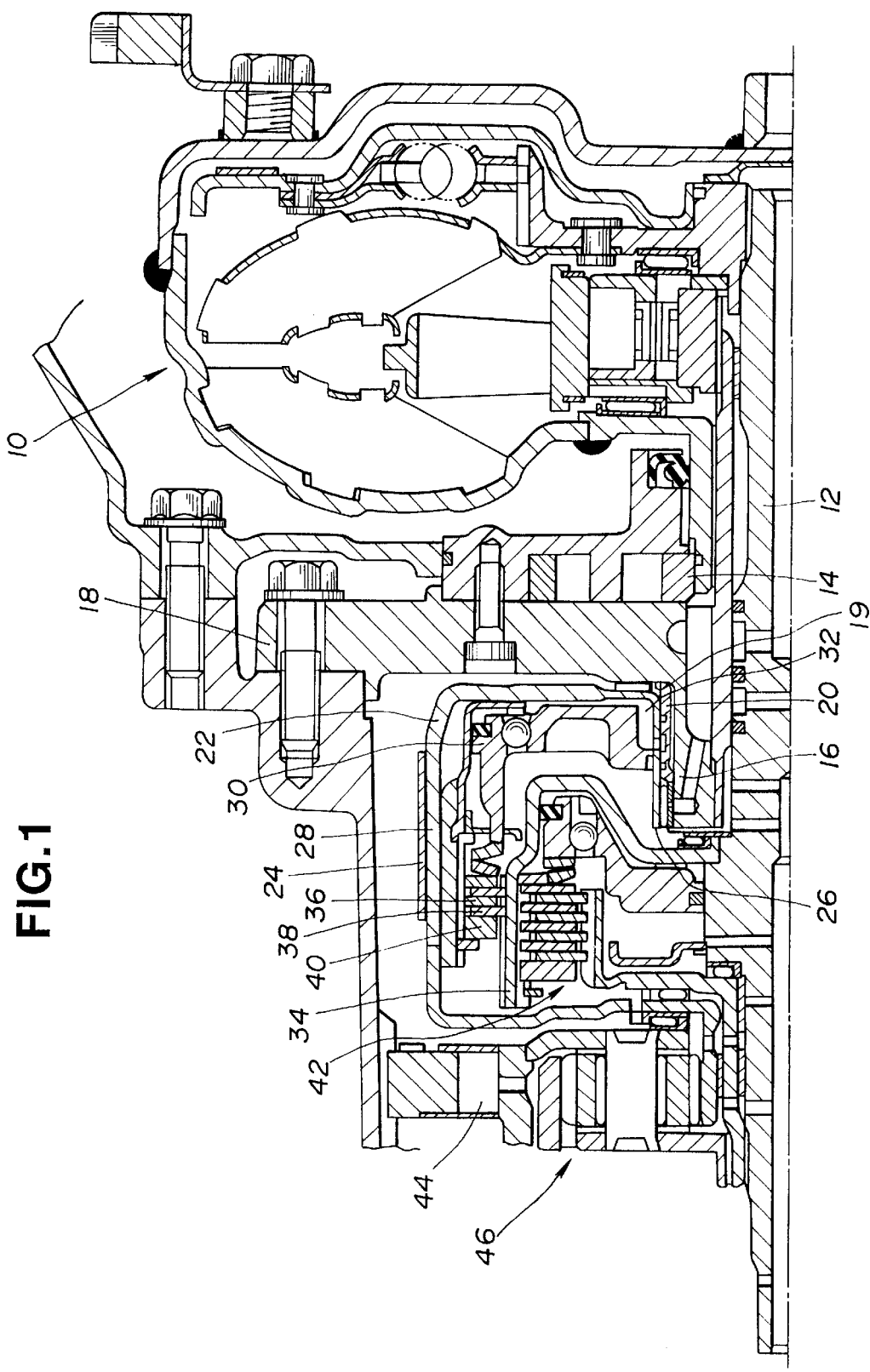
FIG. 1 is a cross-sectional view of an upper portion of an automatic transmission according to the present invention.

Referring now to FIG. 1, there is shown an automatic transmission according to the present invention. The transmission of the present invention may be applied to an automatic transmission disclosed in a publication entitled "NISSAN AUTOMATIC TRANSAXLE RL4F03A—MAINTENANCE PROCEDURE MANUAL, May 19, 1989". As shown in FIG. 1, the transmission includes a transmission case in which are accommodated a torque converter 10, an input shaft 12 driven by the torque converter 10, and an oil pump 14 drivingly connected with the torque converter 10 for supplying hydraulic fluid. The input shaft 12 has an axis X which is common to a stationary shaft 16 formed integrally with a pump cover 18 of the oil pump 14. The stationary shaft 16 is received in a sleeve 20 as described in detail below, on which a drum 22 is rotatably disposed. A brake band 24 is opposed to the drum 22 and frictionally engageable therewith. The drum 22 has inner and outer walls 26 and 28 between which a piston 30 is slidably disposed. The piston 30 cooperates with the inner and outer walls 26 and 28 to form a clutch apply chamber 32. A clutch hub 34 is disposed within the drum 22 in a spaced relation to the piston 30 and secured at its inner end to the input shaft 12. A plurality of friction discs 36 are splined to an inside face of the outer wall 28 of the drum 22 and are interleaved with a plurality of friction discs 38 which are splined to an outer circumferential face of the clutch hub 34. A backup plate 40 is splined to the outer wall 28 of the drum 22 adjacent to the friction discs 38. Thus, the piston 30, the friction discs 36 and 38, and the backup plate 40 cooperate with the drum 22 to form a reverse clutch. When a pressure of hydraulic fluid supplied from the oil pump 14 is applied to the clutch apply chamber 32, the piston 30 is moved leftward as viewed in FIG. 1, so that the friction discs 36 and 38 are frictionally engaged. The engagement of the friction discs 36 and 38 causes the drum 22 to rotate together with the clutch hub 34. The drum 22 also houses a high clutch 42. Reference numerals 44 and 46 respectively indicate a one-way clutch and a first planetary gear set connected to a second planetary gear set (not shown).

Figure 2:
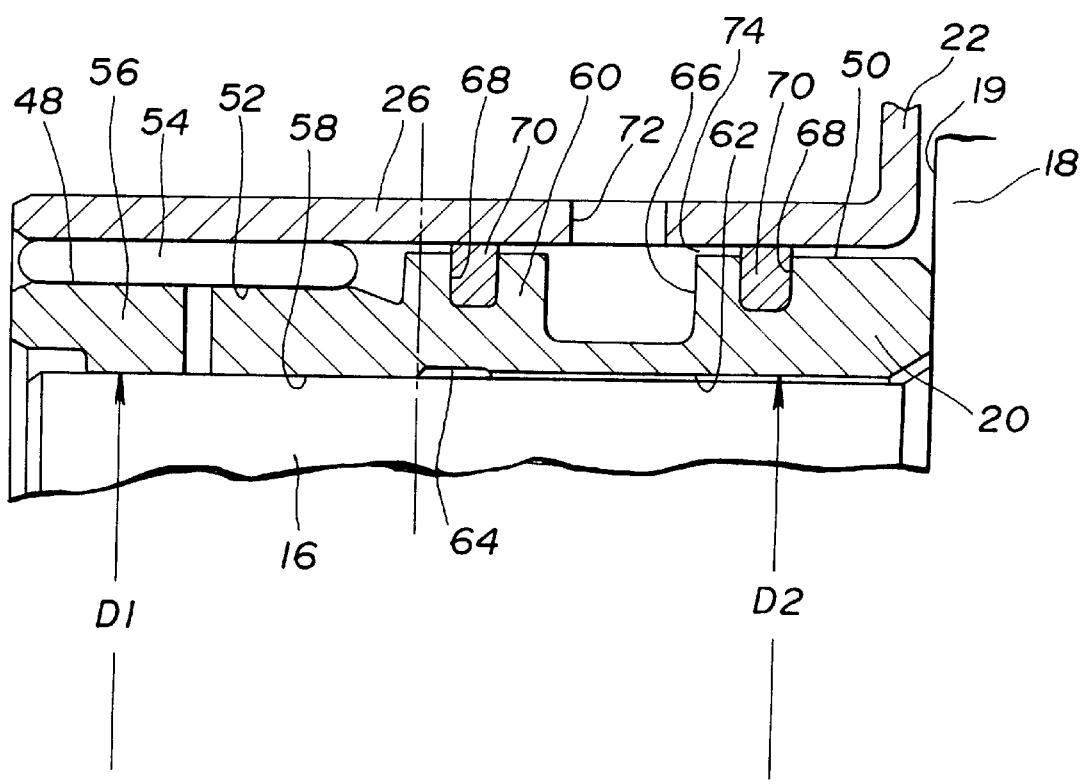
FIG. 2 is an enlarged view of FIG. 1, showing a sleeve receiving a shaft.

Referring to FIG. 2, the sleeve 20 will be in detail described hereinafter. As shown in FIG. 2, the sleeve 20 is divided into and includes a first sleeve portion 48 and a second sleeve portion 50 as indicated by two-dot chain line. The first sleeve portion 48 is formed with a bearing support 52 on which a bearing 54 is mounted for rotatably supporting the drum 22 thereon.

The first sleeve portion 48 includes a first wall 56 which defines a first bore section 58 having an inner diameter D1 as indicated in FIG. 2. There is no clearance between the first wall 56 of the first sleeve portion 48 and the stationary shaft 16. Therefore, the first wall 56 is firmly engaged with the stationary shaft 16.

The second sleeve portion 50 includes a second wall 60 which defines a second bore section 62 having an inner diameter D2 as indicated in FIG. 2. The inner diameter D2 of the second bore section 62 is larger than the inner diameter D1 of the first bore section 58. The second wall 60 carries a pair of seal rings 70, 70 on an outer circumferential face thereof to provide a cylindrical clearance 74 between the second wall 60 of the second sleeve portion 50 and the stationary shaft 16. The cylindrical clearance 74 has such a predetermined axial length as to prevent a stress from being exerted on the seal rings 70 via the second wall 60. Thus, the second wall 60 is loosely engaged with the stationary shaft 16 with clearance fit.

The wall 60 of the second sleeve portion 50 is formed with an annular groove 64 on its inner circumferential face so as to be axially disposed adjacent the first bore section 58 of the first sleeve portion 48.

The second wall 60 of the second sleeve portion 50 is also formed with an annular recess 66 and seal ring grooves 68, 68 on both sides of the annular recess 66 on its outer circumferential face. The pair of seal rings 70, 70 are fitted to the seal ring grooves 68, 68 to contact the inner wall 26 of the drum 22. The seal rings 70, 70 cooperate with the inner wall 26 of the drum 22 and the sleeve 20 to define therebetween a space acting as a fluid passage. The fluid passage communicates to the clutch apply chamber 32 via an opening 72 which is formed on the inner wall 26 of the drum 22.

Figure 3:
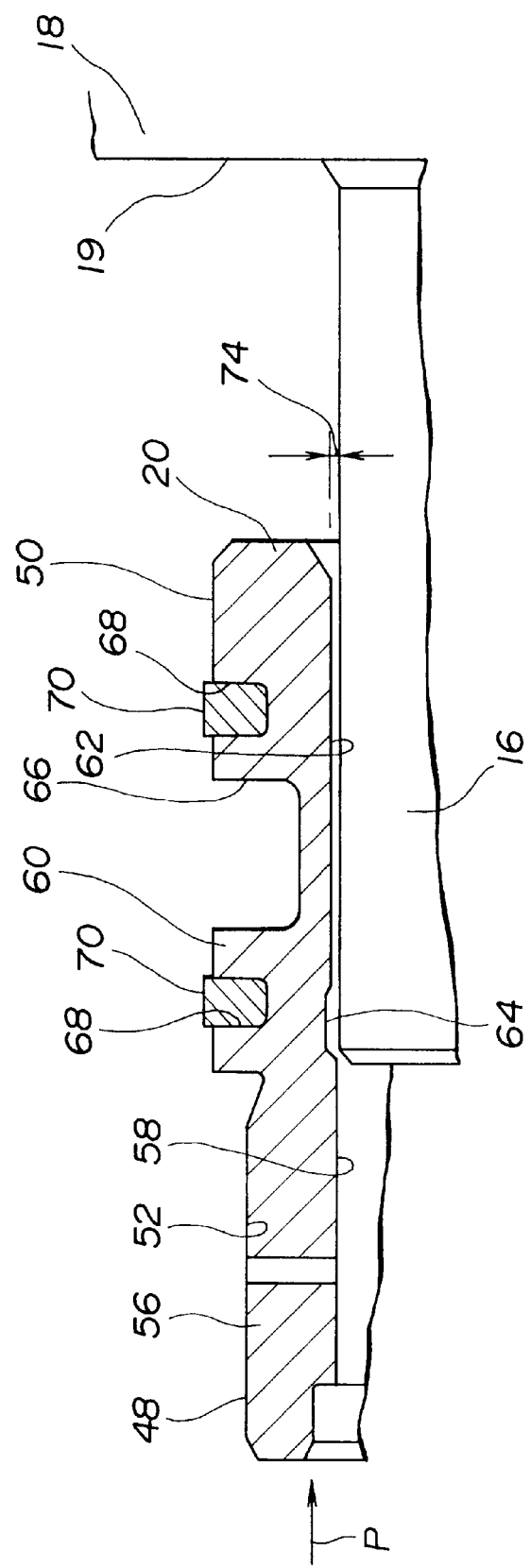
FIG. 3 shows a manner in which the sleeve is mounted on the shaft.

As shown in FIG. 3, the sleeve 20 is driven axially as indicated by the arrow P in a press-fitting manner until one end of the sleeve 20 engages an axial end face 19 of the pump cover 18. Thus, the sleeve 20 is mounted on the stationary shaft 16 as seen in FIG. 2. During this mounting, owing to the cylindrical clearance 74 between the second wall 60 and the stationary shaft 16, the second wall 60 is free from a tensile stress exerted thereon. As is appreciated from the above description, the clearance fit of the second sleeve portion 50 to the stationary shaft 16 prevents the tensile stress from being exerted on the second wall 60. Accordingly, the seal ring grooves 68, 68 and the seal rings 70, 70 fitted thereto are free from a stress, viz. a hoop tension caused by the tensile stress.

What is claimed is:

1. In a transmission:

a shaft having an axis;

a sleeve receiving said shaft, said sleeve being axially, with respect to said axis, divided into and including a first sleeve portion and a second sleeve portion, said first sleeve portion being formed with a bearing support, said second sleeve portion being formed with seal ring grooves; and a drum rotatably supported by said bearing support of said first sleeve portion, said first sleeve portion being formed with a first bore section and first wall means for defining said first bore section, said second sleeve portion being formed with a second bore section and second wall means for defining said second bore section, said first wall means being firmly engaged with said shaft, said second wall means being in spaced relationship with said shaft with clearance fit.

2. A transmission as claimed in claim 1, wherein the inner diameter of said second bore section is larger than the inner diameter of said first bore section.

3. A transmission as claimed in claim 2, wherein said second sleeve portion is formed with an annular groove adjacent said first bore section of said first sleeve portion.

4. A transmission comprising:

a shaft having an axis;

a sleeve receiving said shaft, said sleeve being axially, with respect to said axis, divided into and including a first sleeve portion and a second sleeve portion, said first sleeve portion being formed with a bearing support; and a drum rotatably supported by said bearing support of said first sleeve portion;

said first sleeve portion being formed with a first bore section and first wall means for defining said first bore section;

said second sleeve portion being formed with a second bore section and second wall means for defining said second bore section;

said second wall means carrying seal rings to provide a cylindrical clearance between said second wall means and said shaft for preventing a stress from being exerted on said seal rings via said second wall means.

* * * * *